Aug. 16, 1955  G. S. DOLGORUKOV  2,715,433
MOTOR VEHICLE SEAT CONSTRUCTION
Filed Aug. 10, 1950  4 Sheets-Sheet 1

INVENTOR.
Gregory S. Dolgorukov

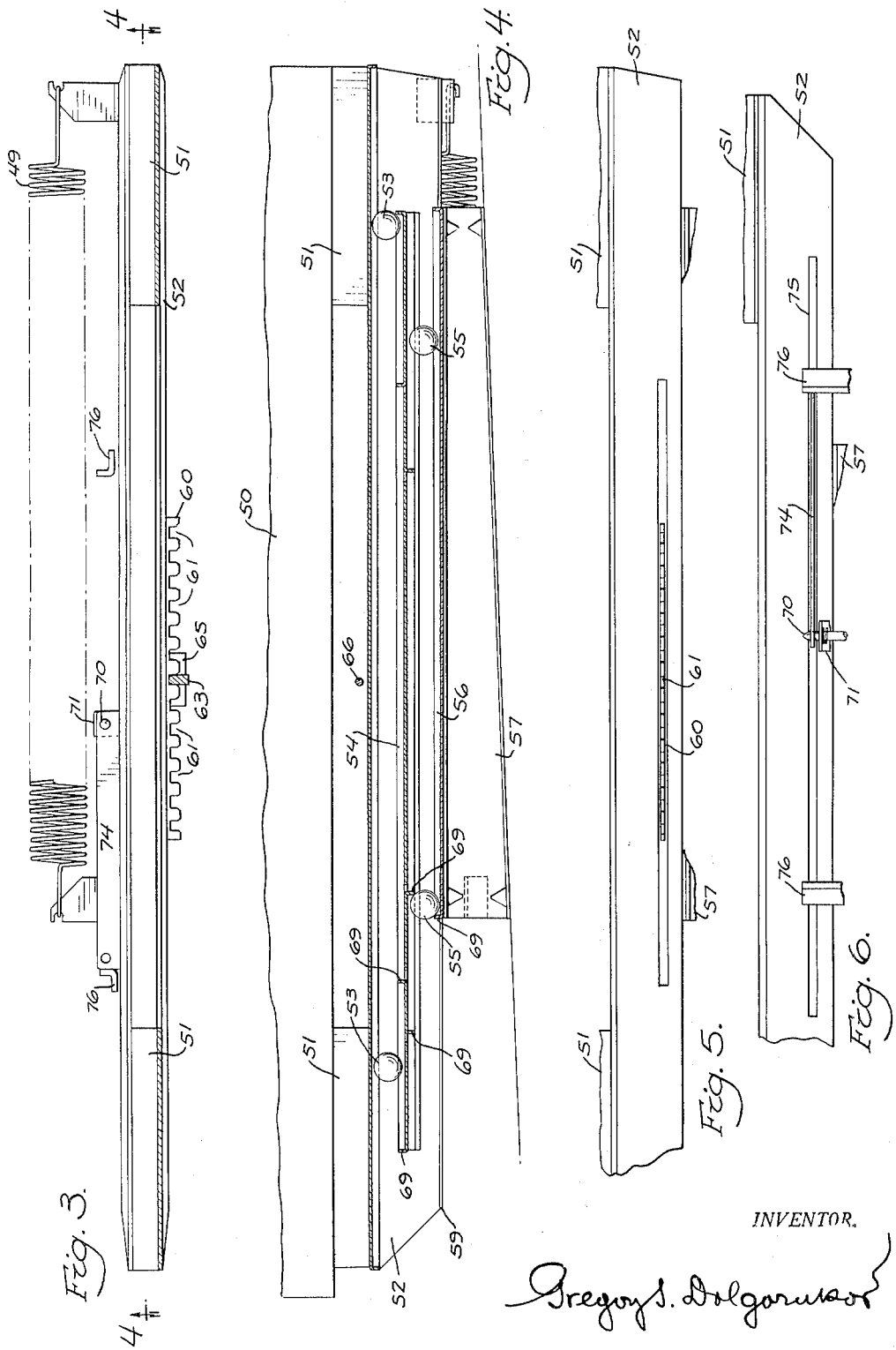

Aug. 16, 1955  G. S. DOLGORUKOV  2,715,433
MOTOR VEHICLE SEAT CONSTRUCTION
Filed Aug. 10, 1950  4 Sheets-Sheet 3

INVENTOR.
Gregory S. Dolgorukov

United States Patent Office 2,715,433
Patented Aug. 16, 1955

2,715,433

MOTOR VEHICLE SEAT CONSTRUCTION

Gregory S. Dolgorukov, Ferndale, Mich.

Application August 10, 1950, Serial No. 178,735

6 Claims. (Cl. 155—14)

This invention relates to seats for motor vehicles and more particularly to an improved adjustable front seat construction therefor.

Virtually all modern motor vehicles have their front seats adjustable for convenience in driving. Such adjustments have been found necessary due to the fact that drivers vary considerably as to their height and other physical characteristics, and a seat which is comfortable for one driver may be too far back for another driver to reach the control pedals, too low for him to hold the steering wheel, and be not only uncomfortable but unsafe in driving. In conventional constructions adjustments are usually effected by moving the seat bodily forward or rearwards and locking it in an adjusted position. In some seat constructions the seat is also made to tilt forward as it is moved, or it may be raised up bodily. Raising of the seat has been found desirable since a shorter driver usually is more comfortable if the seat is also raised as it is moved forward, since otherwise the steering wheel would be too high for convenient driving. A great number of adjustable seat constructions have been devised to permit such adjustments.

While such constructions perform successfully the functions for which they are designed, they do not provide the maximum possible convenience for driving, exit from and entry into the seat, and for safety of operation of the vehicle. Because of the necessity to take into consideration the requirement of styling of the vehicle, arrangement of the engine and of the controls and their operation, the driving position of a vehicle operator is vastly different from a normal sitting position of a person in a chair or the like. A motor vehicle seat is usually only half as high at its seating surface from the floor as is a regular chair, and therefore the feet of the operator are located in a motor vehicle much higher relatively to the seat surface than in a chair. Rising or getting up from such a position is much more difficult than getting up from a regular chair not only for elderly persons, women, or persons having some physical defects, but even for male adults. In order to come out from the front seat through the left door, the driver has to open the door, put the left foot on the ground, and then rise holding on the steering wheel. In some motor vehicles the front post of the door is arranged so far back as to require quite an exertion for such an exit. Moreover, during such exit the door has to be open rather wide which may be dangerous due to traffic. In addition, a relatively short stout person wearing a coat may have the steering wheel virtually on his stomach and must slide out from under the steering wheel before trying to rise from the seat. In cars which by added cost have provided therein means for lowering the upper front edge of the seat in adjusting it further forward, the feet of the driver are, in effect, raised still higher relatively to the seat. In addition, such an expedient, by tilting the seat forward, brings the top of the back rest further forward than the bottom thereof, thus giving more support for the spine at the waist. Driving in such seats for any appreciable length of time is extremely tiresome and may be injurious to health. To correct such defect of the seats, putting up pillows at the back is often resorted to by drivers, and such pillows have become a standard item of automobile accessories. However, handling such a pillow is somewhat annoying, keeping it in place difficult, and for such reason "back pillows" are often omitted by drivers.

The seat of a modern automobile is usually too wide for a shorter person. The front upper edge of the seat, which due to constructional requirements is made somewhat stiff, reaches under the knees of the person, pressing blood vessels against the leg bones, thus interfering with blood circulation, and causing stiffness and fatigue in prolonged driving.

Thus, the construction of front seats of motor vehicles presents a number of serious problems and mutually contradictory requirements. Adapting vehicle seats to the anatomy of the human system is an urgent and serious problem.

One of the objects of the present invention is to provide an improved seat construction for a motor vehicle, in which the above difficulties are overcome and largely eliminated, and which presents a more convenient seat both for driving as well as for exit and entry from the seat, and is more suited to the limitations of human anatomy than are conventional seat constructions.

Another object of the present invention is to provide an improved adjustable seat construction for a motor vehicle, in which the seat can be easily and quickly adjusted by the driver to effect desired "personnal adjustment," i. e. to place the seat into a proper space relationship with respect to the driving controls, such as steering wheel, control pedals, and the like, to provide for convenience of driving and to suit personal physical characteristics of the driver.

A further object of the present invention is to provide an improved adjustable seat construction for a motor vehicle, in which there are provided improved means for effecting personal adjustment of the seat for convenience of driving, and in which there are also provided improved means whereby the seat may be moved rearwardly beyond the rearmost position available in the personal adjustment means, for convenience of exit from the seat.

A still further object of the present invention is to provide an improved adjustable seat construction for a motor vehicle, in which there are provided improved means for effecting personal adjustment of the seat for convenience of driving, means being also provided whereby the seat may be moved rearwardly for a certain definite distance from any personal adjustment position of the seat for convenience of exit from the vehicle, and in which the seat after having been so moved can be quickly returned to the previously made personal adjustment position of the seat.

A still further object of the present invention is to provide an improved adjustable seat construction for a motor vehicle in which the seat can be released and moved rearwardly for a certain definite distance without disturbing the adjustment of the seat made for convenience of driving, and thus to permit an easier exit from the seat when leaving the vehicle, means being provided to lock the seat automatically in such exit position thereof and to retain it in such position in order to permit easier and more convenient entry into the seat when the driver returns to the vehicle, means being also provided whereby the driver after seating himself comfortably in the seat can unlock the seat causing it to be automatically moved forward to the previously selected personal adjustment position of the seat with automatic and secure locking of the seat therein for driving.

A still further object of the present invention is to provide an improved seat construction for a motor vehicle permitting both adjusting of the seat for convenience of driving, and also retracting the seat for convenience of leaving the seat and returning thereinto, the distance through which the seat can be retracted not being affected by any particular personal adjustment position of the seat and remaining the same for all such positions.

A still further object of the present invention is to provide an improved seat construction of the nature specified above, in which construction the retractive and return movements of the seat for convenience of exit and entry therefrom are very easy and virtually automatic and do not require exertion of any appreciable effort on the part of the driver.

A further object of the present invention is to provide an adjustable front seat construction of the above character in which the seat moves easily, noiselessly, and without jamming or binding itself in any position along its range of travel, with such operation of the seat preserved throughout the entire useful life of the vehicle and under adverse conditions of operation, such as when dirt and sand get under the seat and tend to accumulate in the mechanisms thereof.

A still further object of the present invention is to provide an improved adjustable seat construction in which the movements of the seat are effected by rolling contact of the seat on its supporting members, and in which the rolling elements such as balls operate in virtually true rolling and without some of their portions sliding and rubbing on the supporting members. It can be easily appreciated that such rubbing, particularly when coupled with presence of sand and grit, causes disfiguring of the rolling surfaces and soon interferes with rolling substituting it by sliding with all disadvantages thereof.

A still further object of the present invention is to provide an improved adjustable seat construction of the character specified in the preceding paragraph, in which the movable members are adapted to transmit to the supporting structure in rolling contact vertical as well as side loads, and in which transmission of such loads is effected through a multiple-point rolling contact, eliminating local concentration of loads which may cause peening of the hardened steel balls into their race members, as well as excessive wear of the balls and their races.

A still further object of the present invention is to provide an improved adjustable seat construction including balls and races therefor, in which construction means are provided to prevent presence of sand at the lines of rolling, and passing sand into a locality of the structure where it can do no harm.

A still further object of the invention is to provide an improved adjustable seat construction including balls and races therefor which must transmit vertical loads in a single point contact, means being provided to prevent undesirable peening of the balls into the races, excessive wear thereof, as well as rattling of the balls in the races.

A still further object of the present invention is to provide an improved seat for a motor vehicle, which seat is both adjustable for convenience of driving and retractable for convenience of exit and entry from the seat, means being provided whereby both sides of the seat are securely and positively locked to the vehicle structure in all operative positions of the seat.

A still further object of the present invention is to provide an improved adjustable seat construction for a motor vehicle, in which construction adjusting the seat further forward for convenience of shorter drivers also operates to raise such drivers with respect to the steering wheel but does not impair support for the driver's spine at the lower portion thereof.

A still further object of the invention is to provide an improved adjustable seat construction for a motor vehicle, which is simple and rugged in construction, safe and dependable in operation, is relatively inexpensive to manufacture, and is easy to install in a vehicle.

Further objects and advantages of the invention will be apparent from the following description, taken in connection with the appended drawings, in which:

Fig. 3 is a plan view, partly in section, showing the right hand portion (as appearing in Fig. 2) of the seat mechanism, the section being taken on the line 3—3 of Fig. 1.

Fig. 4 is a sectional view of the portion of the construction shown in plan in Fig. 3, the section being taken on the line 4—4 of Fig. 3.

Fig. 5 is a fragmentary side view of the portion of the construction shown in Fig. 4.

Fig. 6 shows the left hand side (in Fig. 2) view of the rear part of the portion of the structure shown in Fig. 5.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In accordance with the invention I provide a front seat construction for a motor vehicle, in which the adjustment of the seat for convenience of driving is effected not by moving the seat longitudinally of the vehicle as in conventional structures, but by moving the back rest longitudinally of the vehicle with respect to the seat, i. e. with the seat remaining stationary. The back rest may be moved either straight forward or parallel to the upper surface of the seat. By such a movement of the back rest I attain simultaneously four important objects: First, I bring the driver closer to or further away from the pedals and the steering wheel, as the length of his legs and arms may require. Second, I automatically bring the shorter driver up, when moving him forward, without raising the seat itself, this result following from the fact that automobile seats are made higher in front than in the back; inversely, a taller driver which must be moved further back, is at the same time brought down; thus the head of the driver, short or tall, is situated at approximately the same elevation in the vehicle, see Fig. 11, which is important for observation of the road in driving and from considerations of the headroom in the vehicle. Third, I make the width of the seat proportional to the length of the legs of the driver, and in cases of shorter drivers relieve the pressure of the upper front edge of the seat on the legs under the knees, thus eliminating the serious but unrecognized source of discomfort and fatigue. Fourth, I provide the maximum desired support for the spine of the shorter driver in spite of moving him up; in conventional constructions having the seat and the back rest tilting forward together this advantage is totally destroyed, and a very unhealthy driving position for shorter drivers is produced.

Furthermore, in accordance with the invention, I provide means whereby the seat and the back rest are movable as a single unit rearwardly of the vehicle for a certain desired definite distance, such as six inches, from its driving position, for convenience of exit from the seat and return thereinto. Thus the seat construction, i. e. both the seat and the back rest, are rigidly but adjustably secured together, but can move bodily longitudinally of the vehicle for a certain distance, such as six inches. Means are provided whereby the seat is automatically locked at the extremities of such a distance or stroke, i. e. in the driving position of the seat and in the retracted or exit position of the seat.

Figure 11:
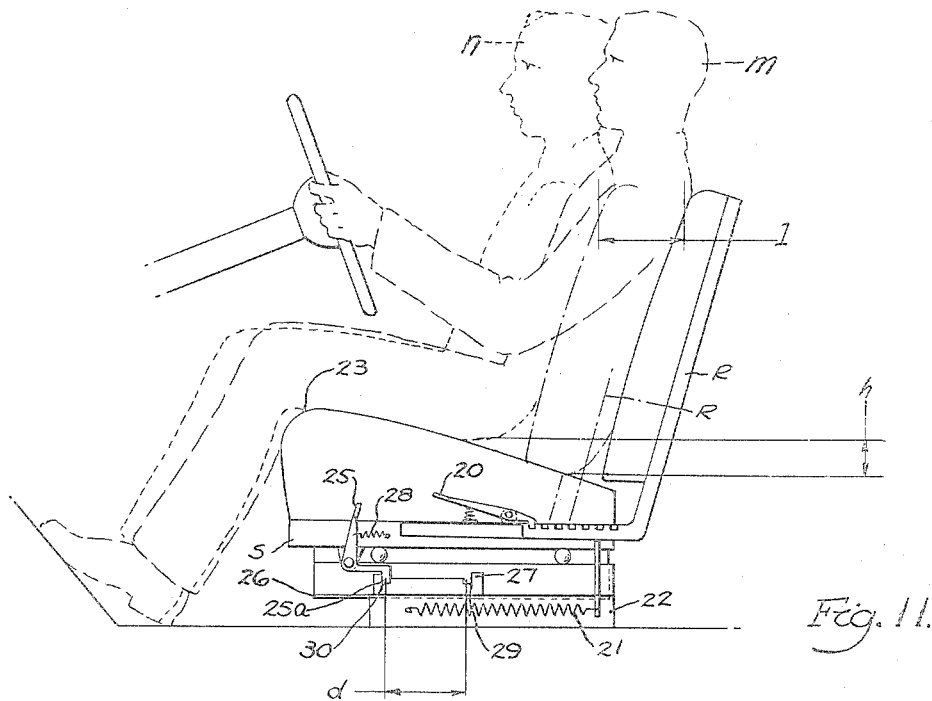
Fig. 11 is a diagrammatic view illustrating in a simplified manner the elements of construction and movements of another type of my improved adjustable seat construction, and illustrates operation of my improved seat with reference to positions of a driver therein.

By virtue of such a construction, the following advantageous operation of the seat, diagrammatically illustrated in Fig. 11 is attained. The driver getting into the seat first adjusts the "seat," i. e. the back rest thereof, for convenience of driving by pressing on the handle 20 and unlocking the back rest R from the seat S. A tall driver whose outline is designated by the letter M would move the back rest all the way back into the position shown in full lines, while a short driver the outline of which is designated by the N would adjust the back rest to the position shown in Fig. 11 in dotted lines. Moving the back rest R to the rear is effected by the driver by pushing it with his back, while the spring 21 having one end connected to the back rest and the other to the guide 22 (or the floor of the vehicle) moves the back rest forward.

It will now be clear from an examination of Fig. 11 that driver N would sit higher on the seat for a distance $h$ than the driver M, while his head is at approximately the same elevation as the head of the driver M; also the driver N will sit further forward for a distance $l$ with his feet reaching the same point as in case of driver M; by moving the knees of the driver N forward relatively to the seat S, pressure of the edge 23 on his underknees is relieved; the inclination of the back rest has not changed and therefore has not pulled its lower portion away from lower portion of the spine of the driver N. The elevation of the steering wheel with respect to the heads and shoulders of both M and N remains also approximately the same.

Now, while the seat construction is now adjusted for convenience of driving and gives maximum comfort for the driver, getting out or getting into the seat may be difficult. In order to come out of my improved seat, the driver presses on the handle 25, unlocking the seat from the guiding base 22. Now the seat S and the back rest R being locked together, they are rolled back on guiding base 22 through the distance $d$, i. e. until the locking tooth 25a of the latch 25 strikes the stop 27, in which position the spring 28 will cause the tooth 25a to enter the recess 29 and thus to lock the seat (and the back rest) automatically to the guide base 22 in their fully retracted position. The driver can now conveniently and without undue or unnatural exertion get out of the seat either through the left door or through the right door. It should be distinctly understood that the seat will roll back for the same distance for either of the drivers, M or N; in other words, the length of the retractive movement of the seat is not affected by adjustment for convenience of driving. When the driver returns to the vehicle, the seat is still locked in its fully retracted position thus providing for more convenient and unrestricted entry into the seat. After the driver has seated himself properly in the seat, by pressing on the lower latch 25 he unlocks the seat from the guide base 22, whereupon the spring 21 moves the seat forward with the tooth 25a getting into the recess 30 and locking the seat automatically in the driving or forward position. It should be appreciated that during the retracting and the return movements of the seat the adjustment for convenience of driving previously made remains undisturbed. Therefore the seat always returns to the proper personal adjustment position. Retracting conventional seats for convenience of exit would require making personal adjustment all over again every time the driver returns to the seat. It is also important to appreciate that if the seat did not lock itself automatically in its fully retracted position, neither getting out nor getting into the seat would be convenient, since the seat spring would keep the seat in some forward position.

It should also be appreciated that due to the provision of rolling contact between the seat and the guide base 22, the retracting (roll back) and the return movements of the seat are smooth and easy. This feature is important, since roll back movements of the seat may be occurring several times during a single hour, while personal adjustment in some cases may be made only once in several years. Therefore personal adjustment movements in the seat construction may be effected either with sliding contact as in the construction of Fig. 11, or with rolling contact as in the construction of Fig. 10.

Figure 10:
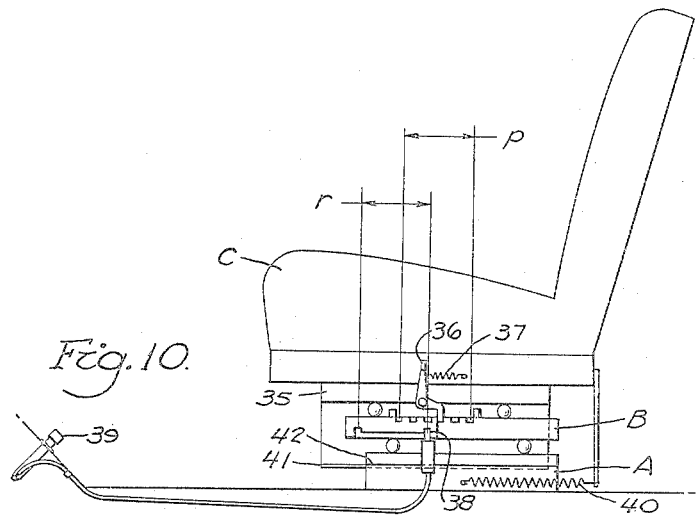
Fig. 10 is a diagrammatic view illustrating in a simplified manner the elements of construction and movements of my improved adjustable seat construction of the type shown in Figs. 1–9.

Also since retracting the seat requires operating seat-unlocking means, such unlocking may be done with the aid of a foot pressed knob and a Bowden wire control as in the construction of Fig. 10.

In accordance with the invention I also provide improved ball races or tracks to have a spaced two-point contact both in the upper and in the lower races to provide for decreasing loads at the points of contact and to transmit side loads. I also provide an added point of contact on the side of each race, which point is contacted only when particularly high side loads are carried. Under such conditions the contact is still a two point one, as can be clearly seen from an examination of Fig. 9.

It will be understood that the above described features of improvement may be used not only in a combination such as illustrated diagrammatically in Fig. 11, but may also be employed with great advantage by being incorporated singly or in various combinations with one another in conventional seat construction, greatly improving the same.

Fig. 10 illustrates diagrammatically an improved adjustable seat construction in which personal adjustments for convenience of driving are made by moving the seat C bodily as in conventional constructions. Such movements of the seat C are longitudinal of the vehicle and may proceed either along a horizontal track or a forwardly rising track, straight or curved. Fig. 10 shows straight horizontal track for the sake of clarity of illustration. The seat C has secured to it a seat track member 35 having a ball race contacting a suitable number, such as two, of balls running in the race provided along the top of the intermediate member B. The seat C may be adjusted with respect to the intermediate member B in any of the plurality of positions along the range or distance $p$ and locked therein with the aid of a latch 36 having a spring 37 constantly urging the latch 36 into its locked position and retaining it therein. On the under side of the intermediate member B there is provided a ball race in which run balls supported in the track or ball race provided in the base guide member A secured to the floor structure of the vehicle. A spring-pressed locking pin 38 locks the intermediate member B to the guide member A in one of the two positions spaced for a desired length of the "roll back" or retractive movement of the seat, such as 6-8 inches. The pin 38 may be unlocked by pressing a foot button 39. However, as the intermediate member B is brought to either forward or rear extremity of the roll back stroke $r$, the pin 39 automatically locks it in that position, requiring pressing of the button 39 for its unlocking. The seat spring 40 constantly urges the seat C toward the front.

A flanged member 41 secured to the seat track member 35 and depending downwardly therefrom extends under and engages a ledge or flange 42 provided on the base guide A. Such a construction prevents undesirable upward movements of the seat C as well as of the intermediate member B when upwardly directed forces are applied thereto. In the construction shown in Fig. 11 this function is performed by the flanged member 26.

It will be understood that it is preferable to provide a set of relatively movable members, such as members A, B and 35, along both sides of the seat to insure its proper functioning. However, providing only one centrally located set may be desirable under certain conditions.

In the position of the parts of the construction illustrated in Fig. 10, the entire seat construction is locked to the floor of the vehicle. The seat C is adjusted in a middle position for convenience of driving and is locked to the intermediate member B by the latch 36. The member B is in its forward or driving position and is locked to the member A (and consequently to the floor) with the aid of the pin 38. For changing personal adjustment, the driver operates the latch 36 and moves the seat back, or permits the seat spring 40 to move it forward, as desired, releasing his hold on the latch for locking the seat in a desired position. During such movements of the seat C, the members B and A remain locked together, and therefore the member B is locked to the floor. For convenience of exit and return to the seat, the driver presses the button 39 and thus unlocks the member B from the member A. Now, the seat C and the intermediate member B being locked together, they roll back as a single unit and upon reaching the end of the roll back distance are automatically locked therein to the member A by the pin 38. There they remain for convenience of exit, as well as for convenience of entry into the seat. After seating himself in the seat, the driver presses the button 39, and the seat spring 40 moves the seat C together with the member B into their driving position on the member A, locking them automatically therein.

With the understanding of the seat movements described with reference to Fig. 10, construction and operation of an actual seat illustrated in Figs. 1–9 will now be easily understood.

Referring to said figures, the construction illustrated therein comprises an upholstered seat 50 of any suitable construction having a seat cushion and a back rest. The seat cushion has a rigid frame or bottom to which there are secured in any suitable manner, such as with the aid of brackets 51, seat track members 52 arranged longitudinally of the vehicle along the two sides of the seat. Referring to one side of the seat for simplicity of description, the top portion of the member 52 is formed to provide a ball race contacting balls 53 at two points. The balls 53 are supported in the ball race formed along the top of an intermediate member 54 formed to provide the upper race for balls 55 supported in the lower ball race formed in the base guide member 56 secured to a base member 57 bolted or otherwise suitably secured to the floor structure 58 of the vehicle. The downwardly depending side flanges of the seat track member 52 embrace the members 54 and 56 and are bent along their lower edges to provide inwardly directed flanges 59 holding the seat and the intermediate member 54 down to the base guide member 56 but permitting relative movements of the members with respect to each other.

A tension spring 49 having its rear end connected to the seat member 52 and its front end connected to the base member 57 constantly urges the seat forward. Springs such as 49 may be provided on both sides of the seats, if desired.

Means are provided to lock the seat track members 52 to their respective intermediate members 54, for effecting personal adjustment for convenience of driving. Said means are exemplified by outwardly directed flanges 60 extending through the side slots in members 52 and provided with a plurality of notches 61. Latches 62 and 63 carried by the members 52 are hingedly mounted in brackets 64 secured to said members at the flanges 59. The latches 62 and 63 are adapted to enter the notches 61 thus locking the seat track members 52 in any desired adjustment position along the personal adjustment range $p$. Brackets 64 are extended upward and provided with short flanges 65 having slots for movement of the latches therein. Such a construction guides the latches, relieves strain on the hinges, and provides more secure locking. The corners of the notches 61 and the edges of the latches 62 and 63 are chamfered in order to facilitate entry of the latches into the notches and to prevent their dwelling between the notches. However the notches are deep enough to prevent self-unlocking of the latches. The latches 62 and 63 are connected by a tie rod 66 having adjustment 67. The spring 68 constantly urges the latches 62 and 63 into their locked positions.

Unlocking of the latches 62 and 63 is effected by pressing on the handle 63a of the latch 63. As the latch 63 is moved into the position indicated in Fig. 2 in dotted lines, it unlocks the seat from the intermediate member at its respective side of the seat, while the tie rod 66 simultaneously moves the latch 62 also into the unlocking position on the other side of the seat. When the latches 62 and 63 are left to themselves, the spring 68 will pull them into the closest notch 61, locking the seat. Ball stops 69 are provided in the races to insure that the balls do not roll out of the races and remain in their respective portions of the tracks, see Fig. 4.

Means are provided at both sides of the seat to lock the intermediate members 54 to the base members 57 at the extremities of the preselected distance $r$ constituting the length of the retracting or the roll back travel of the intermediate member together with the seat. Such means are exemplified by two spring-pressed pins 70 operatively mounted in brackets 71 secured to the base members 57. Since said pins and mechanisms cooperating therewith are identical, only one pin is described in detail. Compression spring 72 of each pin, acting on the collar 73 urges the pin into its upward position. A flange 74 on each of the intermediate members 54 extending outwardly through the slot 75 provided in the seat track member 52 has two holes adapted to be entered by the locking pin 70 when either of the holes registers with the pin. The holes are spaced at the distance $r$ which constitutes the preselected distance of the retractive or roll back movement of the seat, as mentioned. Stops 76 provided on the base member insure registry of the holes of flange 74 with the pin 70 at either of the extremities of the distance $r$. Unlocking of the pins is effected with the aid of a floor button 77 connected with the aid of Bowden wires with the pins 70. Pressing the button 77 operates to withdraw the pins 70 from the flanges 74, and unlocking of the intermediate member (and consequently of the seat) for the roll back or retracting movement. The mechanism or control adapted to transmit the movement from the button 77 to the pin 70 and to transfer the downward movement of the push button 77 into the releasing movement of the pin 70 may be of the Bowden wire or similar type, which controls are well known in the art. This mechanism per se does not form a part of the present invention, and therefor further detailed description thereof apart from the above specified requirement is not believed to be necessary herein. A number of companies specializing in such controls and regularly publishing and distributing their catalogs, are well known to those skilled in the art.

It will be understood that the foot-operated button such as 77 may be substituted by a latch carried by the intermediate member and latching into holes provided on any member secured to floor. If a foot-operated button is used, it should be placed in such a locality as to be naturally pressed by the driver bracing himself against the floor to push the seat back.

Figure 9:
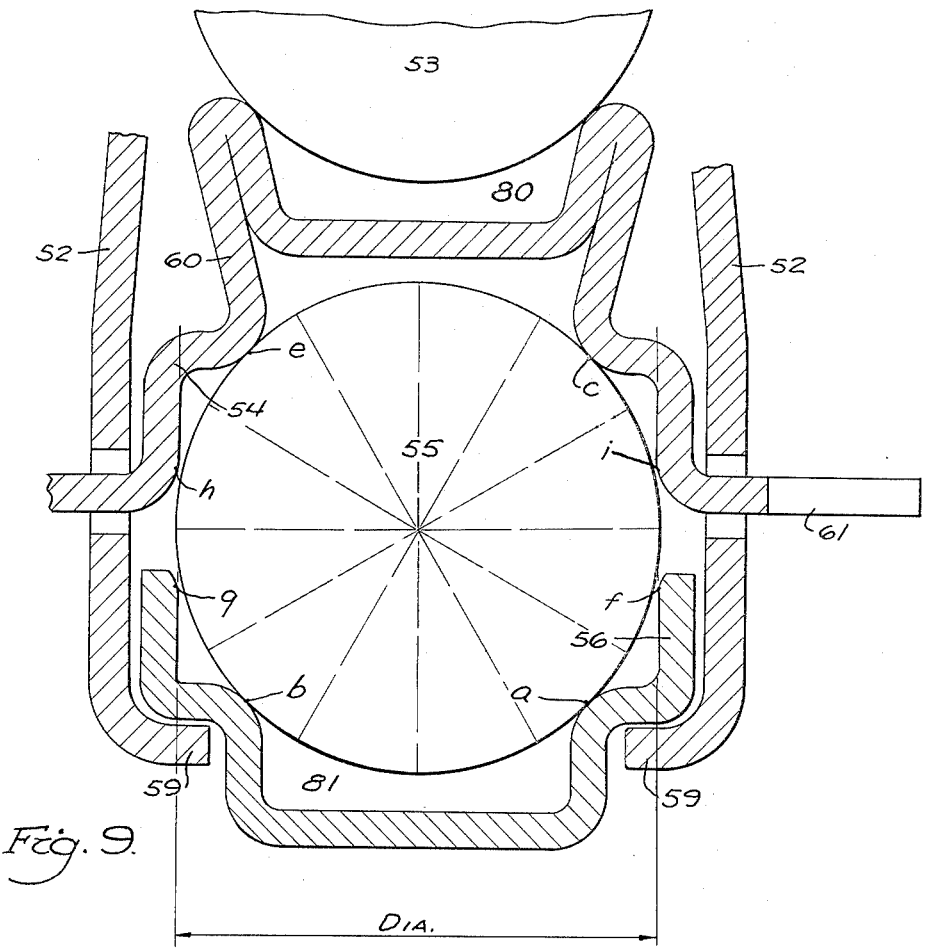
Fig. 9 shows on a large scale the races for the lower balls shown in Fig. 2, illustrating transmission of loads.
Figure 8:
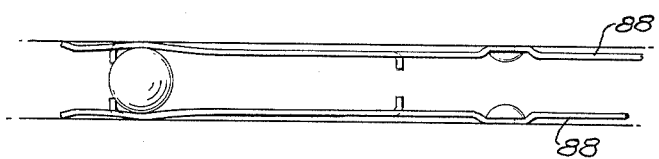
Fig. 8 shows in a side view and separately, the track lining springs preventing wear of the track and rattling of the balls.

Fig. 9 illustrates transmission of loads in my improved ball track. As can be clearly seen from an examination of said figure, the ball 55 normally contacts the race formed in the member 56 at points $a$ and $b$ spaced to fall approximately at lines forming a 90 degree angle therebetween; the race formed in the member 54 is similarly contacted at points $c$ and $e$. By such a contact the total load is divided, and at each of the above points only one half of the total load is transmitted. Moreover, the ball does not wedge itself into the track, and yet considerable side loads can be transmitted through the ball without changing such contact. Additional points of contact $f$, $g$, $h$, and $i$ are provided. When particularly heavy side loads are applied to the seat, the members 52 and 54 move very slightly to one side with respect to the member 56. Presuming that such a movement is to the right, the ball 55 will then contact the member 54 at points $h$ and $e$, and the member 56 at the points $a$ and $f$. It is preferable to make the width (inside) of the members 54 and 56 equal to the diameter of the ball. Since the points $h$, $i$, $g$ and $f$ are disposed at lines where the dimension across the ball is smaller than its diameter, a very slight but sufficient clearance, such as .005", is thus provided in normal operation between said points and the ball.

By virtue of the above construction sand sumps 80 and 81 are also provided in the ball tracks. Grains of sand that otherwise would remain along the lines of running of the balls roll off into the sumps where they can do no harm to the balls. Occasional blowing out of the sand from the races with an air hose will prevent excessive accumulation of sand and dirt therein.

Figure 7:
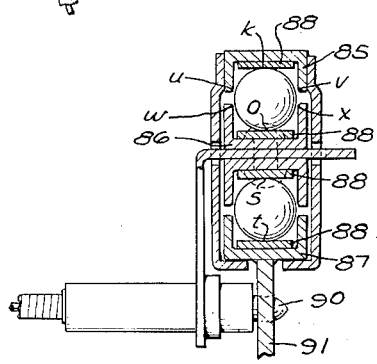
Fig. 7 is a sectional view showing a modified construction of the ball races and locking pin arrangement.

Fig. 7 shows a modified construction of the track races and of the arrangement of the locking pin on the track members. In this construction the ball races provided in the seat track member 85, intermediate member 86, and the base guide member 87 are of a channel cross section. Hardened spring steel strips 88 are provided along the bottom (top if inverted) of each of the channels, as shown. Thus while the members 85, 86, and 87 may be made from low carbon steel, the ball races are, in effect, made of hardened steel, and therefore the single point ball contact does not operate to cause peening of the balls into the track. It should be appreciated that both the upper and the lower races of a track should be lined as disclosed in order to attain the above advantage, since lining only the lower race is not sufficient. In this construction manufacturing of the tracks is greatly simplified, and standard rolled I-beam may be used for the intermediate member 86, while a standard rolled channel may be used for the base guide member 87. The width of the channel races of all tracks is preferably equal to the diameter of the balls, and the height of the channel races is so selected that in addition to the main points of contact $k$, $o$, $s$ and $t$, four additional points of contact, such as points $u$, $v$, $w$, and $x$ in the upper track, are made available for each ball on the sides of the races for transmission of heavy side loads. If desired, the strips 88 may be so shaped by bending their ends or otherwise, as to exert spring pressure on their respective balls and to follow them for a slight distance should the tracks move slightly apart due to application of an upwardly directed force on the seat. By virtue of such a construction, best illustrated in Fig. 8, rattling of the balls in races is prevented. In the construction of Fig. 7, the locking pin 90 is carried by the intermediate member 86 and is adapted to enter holes provided in the base member 91 to which the base guide member 86 is secured or with which it forms an integral construction.

Various other modifications may be incorporated in my improved seat construction herein disclosed without departing from the invention. For instance, handles for operating the personal adjustment mechanism and the roll back mechanism may be differently arranged. One of such handles, particularly the personal adjustment latch handle, may be arranged under the lower front edge of the seat, while the roll back release handle may be arranged at the left hand side of the seat. Also, intermediate member may be eliminated, and the personal adjustment latch hinge made slidable in the seat member while remained locked to the base guide member. Locking means for locking the latch hinge at both ends of its sliding stroke will then function as an equivalent of the locking pins, and releasing them will permit the seat to slide or roll back for convenience of exit and entry.

Figure 1:
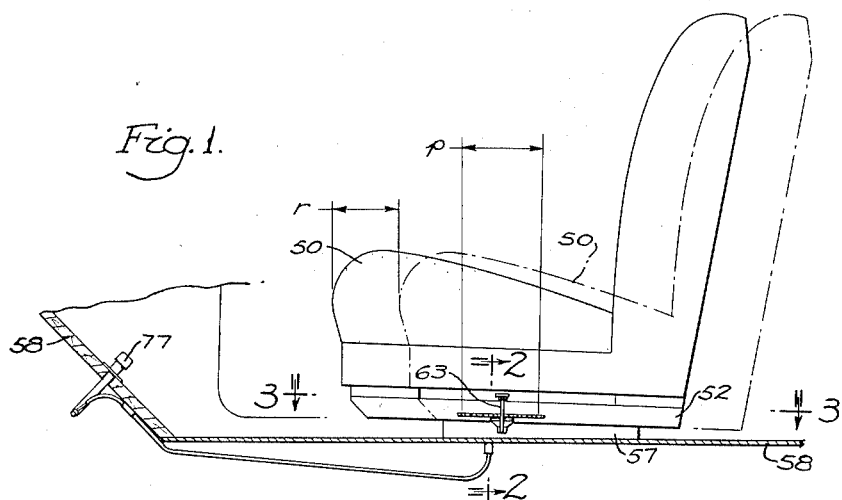
Fig. 1 is a side view, partly in section, showing an adjustable seat construction embodying the invention. The seat is shown adjusted in one of the intermediate positions for convenience of driving, and all the way forward in its retracting mechanism.
Figure 2:
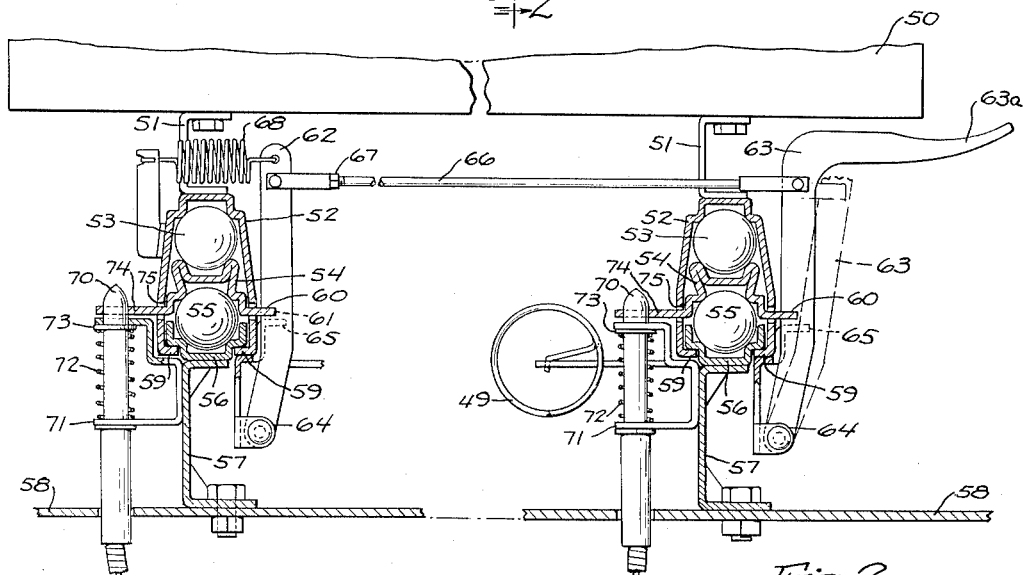
Fig. 2 is a transverse vertical sectional view on a larger scale of the seat construction of Fig. 1, taken in the direction of the arrows on the section plane passing through the line 2—2 of Fig. 1.

It will be also understood that my improved ball races may be incorporated into seat constructions having no roll back movement, and greatly improve such constructions. In Fig. 1 the tracks are shown to be straight and slightly rising toward the front of the vehicle. Tracks may be made curved or made straight and horizontal, rollers may be used instead of balls, etc.

By virtue of the above disclosed constructions, objects of the present invention listed above and numerous additional advantages are attained.

I claim:

1. In a front seat construction for a motor vehicle, a seat adapted to support at least one occupant, means supporting said seat and providing for adjusting the same with respect to the vehicle in one of more than two fixed positions for convenience of driving, guiding means supporting said seat-supporting means and providing for moving the same toward the rear of the vehicle, to facilitate exit of an occupant, for a predetermined and constant distance from any adjusted position of said seat in said supporting means without disturbing the adjusted position for convenience of driving, means automatically and positively locking said seat-supporting means in said guiding means in either of the two extremities and only the extremities of said distance, manually operated means for unlocking said locking means, spring means moving said seat from the rear extremity of said distance to the front extremity thereof, said spring means yielding to the effort of the occupant moving the seat rearwardly.

2. The construction defined in claim 1, free rolling elements being interposed between said seat-supporting and said guiding means.

3. The construction defined in claim 1, a plurality of balls being interposed at least between said seat-supporting and said guiding means, each of said balls transmitting loads at four points.

4. In a front seat construction for a motor vehicle, a seat adapted to support an occupant; supporting means for said seat; means on said supporting means for moving the seat with respect to the vehicle for adjusting the seat selectively in any one of a plurality of positions greater than two for convenience of driving and locking the seat in such selected position; guiding means secured to the floor of the vehicle and providing for bodily movement of said seat and its supporting means longitudinally of the vehicle in the rearward direction, for convenience of exit, between two preselected extremities; locking means for said seat and its supporting means to lock them automatically and positively at either of said two extremities and only at extremities as they reach the same; manually operated means for releasing said locking means; and spring means having one end connected to said seat and the other to the floor structure of the vehicle and constantly urging said seat forward.

5. An adjustable front seat construction for a motor vehicle, said construction comprising a seat including a seat cushion adapted to support an occupant and a back rest connected to said seat and movable with respect to said cushion for adjusting the relative position of the cushion and the back rest for convenience of driving, guide means supporting said cushion and said back rest, said guide means being rigid with the vehicle structure, said cushion and said back rest being adapted to be moved bodily in said guide means rearwardly of the vehicle without disturbing their relative adjustment made for convenience of driving for a predetermined and constant distance for convenience of exit and entry into the seat, the constancy of said distance being unchanged by any adjustments for convenience of driving, locking means adapted to lock said seat to said guide means automatically and positively both in its fully retracted position and its driving position as said positions are reached, and manually operable means for releasing said locking means.

6. In a front seat construction for a motor vehicle, a seat adapted to support at least one occupant, means supporting said seat and providing for adjusting the same with respect to the vehicle in one of more than two fixed positions, for convenience of driving; guiding means supporting said seat-supporting means and providing for moving the same for a predetermined and constant distance toward the rear of the vehicle to facilitate exit of an occupant, from any adjusted position of said seat in said supporting means without disturbing the adjusted position for convenience of driving; means automatically and positively locking said seat-supporting means in said guiding means in either the front or the rear extremity of said distance and only at said extremities; manually controlled means for unlocking said locking means; said seat being movable rearwardly in said guiding means when said locking means holding the seat at the front extremity of said distance are unlocked, and means moving said seat forwardly without exertion of manual effort on the part of the occupant when the locking means holding the seat at the rear extremity of said distance are unlocked.

References Cited in the file of this patent

UNITED STATES PATENTS

| | | |
|---|---|---|
| 1,685,770 | Bowen | Oct. 2, 1928 |
| 1,770,826 | Allgeyer | July 15, 1930 |
| 2,003,549 | Miller | June 4, 1935 |
| 2,149,946 | Whedon et al. | Mar. 7, 1939 |
| 2,188,997 | Davis | Feb. 6, 1940 |
| 2,202,113 | Miller | May 28, 1940 |
| 2,261,728 | Lawler | Nov. 4, 1941 |
| 2,271,913 | Crabb | Feb. 3, 1942 |
| 2,579,599 | Moroney | Dec. 25, 1951 |
| 2,600,005 | Kronhaus et al. | June 10, 1952 |

FOREIGN PATENTS

| | | |
|---|---|---|
| 209,057 | Switzerland | June 1, 1940 |
| 302,059 | Great Britain | Dec. 13, 1928 |
| 308,862 | Great Britain | Apr. 4, 1929 |